United States Patent [19]
Rowton

[11] 3,979,364
[45] Sept. 7, 1976

[54] POLYURETHANE ELASTOMERS HAVING IMPROVED SAG RESISTANCE

[75] Inventor: Richard Lee Rowton, Austin, Tex.

[73] Assignee: Jefferson Chemical Company, Inc., Houston, Tex.

[22] Filed: Sept. 23, 1974

[21] Appl. No.: 508,455

[52] U.S. Cl. ........................ 260/77.5 AM; 428/425
[51] Int. Cl.² ........................................ C08G 18/38
[58] Field of Search ............................ 260/77.5 AM

[56] References Cited
UNITED STATES PATENTS

| | | | |
|---|---|---|---|
| 3,666,788 | 5/1972 | Rowton | 260/77.5 AQ |
| 3,714,127 | 1/1973 | Fabris et al. | 260/77.5 AM |
| 3,714,128 | 1/1973 | Rowton et al. | 260/77.5 AM |

*Primary Examiner*—M. J. Welsh
*Attorney, Agent, or Firm*—James L. Bailey; Lee G. Meyer

[57] ABSTRACT

The use of small amounts of an amine-terminated polyether in the B-component of a two-component polyurethane composition results in the immediate thickening of the A and B-components upon mixing to provide an elastomer precursor with improved sag resistance without substantially affecting the workability of the mixed components or the properties of the cured elastomer. These elastomers are useful as sealants, caulks and surface coatings.

13 Claims, No Drawings

POLYURETHANE ELASTOMERS HAVING IMPROVED SAG RESISTANCE

BACKGROUND OF THE INVENTION

1. Field of the Invention

This invention relates to polyurethane materials, particulary plyurethane elastomers which are resistant to sagging prior to cure when applied on non-horizontal surfaces.

2. Description of the Prior Art

Conventional polyurethane-base elastomers employed as adhesives, sealants, caulks or surface coatings suffer a serious disadvantage in that they tend to sag and run off or drip down when applied on non-horizontal surfaces. There have been many attempts to overcome this disadvantage. It has been known to add thickeners such as fillers, powders, and the like to one or both of the components of the polyurethane composition so that, when mixed, the composition will have sufficient viscosity to resist sagging. However, the use of such thickeners in amounts which are effective cause problems in the handling of the components. For example, the components become so viscous as to present difficulties in obtaining the proper mixing of the two components in conventional applicator devices. An alternate approach to improving sag resistance of polyurethane compositions is to increase the amount of catalyst in the urethane composition to promote quicker thickening. This approach is generally unsatisfactory in dealing with large batches because of the higher exotherm and the unduly shortened set time encountered.

The use of amines, such as those of U.S. Pat. No. 3,654,370, as the B-component is impractical. The reaction of the amine with the A-component is so fast that the mixed elastomer would become immediately set upon mixing of the A- and B-components. Also, cyanoalkylated derivatives of certain amines, such as those of U.S. Pat. No. 3,666,788 although suitable as the B-component in some coating compositions, are unsuitable when the mixed elastomer system must remain workable for several minutes.

The addition of amines to polyurethane compositions to increase the sag resistance is known. However, the general approach is to add an amine to the B-component and add an amount of isocyanate equivalent to the amine to thereby form a thickened B-component. The disadvantage of this method is that to obtain the desired sag resistance in the mixed elastomer, it may be necessary to thicken the B-component to an extent that it becomes unnecessarily difficult to work with.

Another approach to improving sag resistance involves the addition of certain di- or multi-primary amines to the B-component of polyurethane compositions as is disclosed in U.S. Pat. No. 3,714,127. However, upon the mixing of the two components of such polyurethane compositions, there is generally a lag in the thickening action and the mixed elastomer will tend to sag if applied immediately after mixing. If very large amounts of the amines are employed to reduce the time required to thicken the mixed elastomer, the exotherm of the mixed system is generally higher and the set time of a large batch would be significantly shortened. Regardless of the amount of such amines which are incorporated into the composition, there results a mixed polyurethane composition in which the workability or consistency is constantly changing.

From the above, it is apparent that, although there have been many attempts to improve the sag resistance of polyurethane compositions without adversely affecting other properties of the mixed elastomer, none has been entirely satisfactory.

It is an object of the present invention to provide a polyurethane elastomer composition which, when mixed, will not sag when applied in thick films or layers on non-horizontal surfaces. It is also an object of the present invention to provide a polyurethane elastomer composition which is easy to handle and does not involve extremely viscous components. Further, it is an object of the present invention to provide a modified polyurethane composition which, when mixed, thickens immediately to provide sag resistance, yet substantially retains the long set times and cured elastomer properties characteristic of unmodified systems.

The advantages and other objects of our invention will become apparent to those skilled in the art in view of the aforementioned background, the following discussion and accompanying examples.

SUMMARY OF THE INVENTION

Our invention relates to the production of polyurethane compositions wherein sag resistance is improved by the inclusion in the B-component of from about 1 to about 50 equivalents of a polyoxyalkylene polyamine per 100 equivalents of polyether polyol in the B-component. The inclusion of these amine-terminated polyethers into the B-component results in immediate thickening when mixed with the A-component and thereby improves the sag resistance of the mixed elastomer system. The B-component thus modified is not thickened prior to mixing with the A-component and thus remains easy to work with. Moreover, the cure time of the mixed elastomer system is not significantly shortened. Thus, improved sag resistance is obtained by use of the amine-terminated polyethers of this invention without adversely affecting other elastomer properties.

DESCRIPTION OF THE PREFERRED EMBODIMENTS

This invention applies to a wide variety of polyurethane elastomer compositions. The sag resistance of polyurethane elastomer compositions prepared by mixing an organic polyisocyanate A-component with a polyether polyol-containing B-component is improved by incorporating into said B-component a small amount of a polyoxyalkylene polyamine or its partially cyanoalkylated derivative. The polyurethane elastomer compositions thus modified thicken immediately upon the mixing of the A- or B-components to a consistency such that relatively thick layers, films, or beads of up to approximately one-half inch thickness may be applied to non-horizontal surfaces without sagging. Moreover, the viscosity characteristics of the mixed elastomer system are relatively flat, that is, after the initial rapid viscosity increase occasioned by the mixing of the A- and B-components, the viscosity or consistency of the mixed composition thereafter increases only at a slow rate during the normal curing process of the elastomer composition. The practice of this invention results, therefore, in a mixed polyurethane elastomer composition which is viscous enough at the outset to be applied in thick layers, yet remains workable for relatively long periods. In most cases, the period of workability is almost as long as that of a mixed polyurethane elastomer composition not containing the amine-terminated polyethers of this invention.

The A-component, as used herein, refers to a first component, in the two component polyurethane system, which contains an organic compound having unreacted or free isocyanate moieties as more particularly later described herein. The B-component, as used herein, refers to the second component in the two component polyurethane system. The B-component comprises a selected urethane catalyst and a polyhydroxy compound, more particularly a polyether polyol having active hydrogens but is free of unreacted isocyanate groups as more particularly later described herein. These components and preferably the B-component can optionally contain other materials such as crosslinkers, additives, fillers, other catalysts, thickeners, stabilizers and the like.

The polyoxyalkylene polyamine gellers used in the practice of this invention to improve the sag resistance of the polyurethane compositions without disadvantageously affecting the set time and handling characteristics of the elastomer compositions are represented by the formula

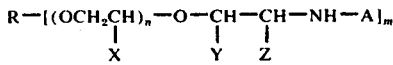

wherein R is the nucleus, i.e., the residue, of an oxyalkylation-susceptible aliphatic polyhydric alcohol containing 2 to 12 carbon atoms and 2 to 8 hydroxyl groups, A is hydrogen or cyano-lower-alkyl having 1 to 2 carbon atoms between the nitrogen and the cyano radical, Z is an alkyl group containing 1 to 18 carbon atoms, X and Y independently are hydrogen or Z, $n$ has an average value of 0 to 50, and $m$ is an integer of 2 to 8 corresponding to the number of hydroxyl groups originally present in the polyhydric alcohol. The above polyoxyalkylene polyamines and their cyano-alkylated derivatives are described in further detail in U.S. Pat. No. 3,654,370 and U.S. Pat. No. 3,666,788 which are herein incorporated by reference.

The preferred amine-terminated polyethers of this invention are the polyoxypropylene polyamines of the above formula wherein Z is methyl, Y is hydrogen, X is Z, A and R are as above-defined, and $n$ is from 1 to 16, and $m$ is from 2 to 4. Especially preferred are the polyoxypropylene diamines of the formula

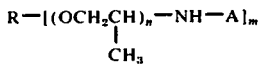

wherein R is 1,2-propylene radical, $m$ is 2, $n$ is from 2 to 6 and A is as above-defined; and polyoxypropylene triamines of the formula

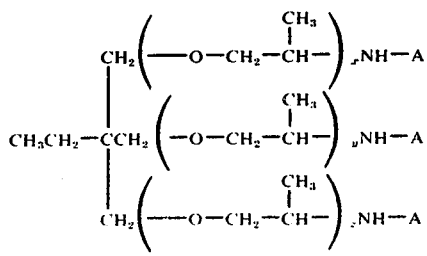

wherein R is the nucleus of trimethylolpropane, $m$ is 3, $x$, $y$, and $z$ independently are from 1 to 10 with the sum of $x+y+z$ being from about 3 to about 30, and A is as above-defined. It should be understood that the amine-terminated polyethers derived from the polyoxyalkylene polyols containing 3 or more hydroxyl groups, e.g., the trimethylolpropane-derived polyols depicted above, will not necessarily contain the same number of oxyalkylene groups in each of the polyoxyalkylene chains in the molecule. Moreover, each molecule of the polyol may contain different numbers of oxyalkylene groups in each of the oxyalkylene chains. Thus, in the above formula, $x$, $y$ and $z$ represent an average value and it is thus necessary to refer to the sum of $x+y+z$ in terms of the average number of oxyalkylene units present in the overall amine-terminated polyether. The preferred polyoxypropylene triamines of trimethylolpropane are those wherein the sum of $x+y+z$ is from about 4.6 to 9.8. The particular amine gelling agents are similar in structure to the polyether polyols in the B-component and, therefore, do not greatly alter the final properties of the cured urethane elastomer.

The other essential ingredient of the B-component of the polyurethane commpositions of the instant invention, in addition to the amine-terminated polyether herein described, is a polyether polyol. Polyether polyols useful in the practice of our invention are those diols, triols, tetrols and mixtures thereof having a molecular weight of from about 500 to about 10,000. The diols are generally polyalkylene ether glycols such as polypropylene ether glycol, polybutylene ether glycol and the like, and mixtures thereof. Mixed polyether polyols can also be used such as the condensation products of alkylene oxide with a polyhydric alcohol having three or four primary hydroxyl groups such as glycerol, trimethylolpropane, 1,2,6-hexanetriol, pentaerythritol, and the like. These polyether polyols are well-known and may be prepared by any known process such as, for example, the processes discussed in Encyclopedia of Chemical Technology, volume 7, pages 257–262, published by Interscience Publishers, Inc. in 1951.

As mentioned above, any suitable polyhydric polyalkylene ether may be used, such as, for example, the addition product of an alkylene oxide with a polyhydric alcohol. Any suitable polyhydric alcohol may be used such as, for example, ethylene glycol, 1,2-propylene glycol, 1,3-propyene glycol, 1,4-butylene glycol, 1,3-butylene glycol, glycerine, trimethylolpropane, 1,2,6-hexanetriol, pentaerythritol, and the like. Any suitable alkylene oxide may be used such as, for example, ethylene oxide, propylene oxide, butylene oxide, amylene oxide, their various isomers, and the like. Of course the polyhydric polyalkylene ether polyols can be prepared from other starting materials such as, for example, tetrahydrofuran, epihalohydrin, aralkylene oxides such as, for example, styrene oxide, and the like. Polyhydric polyether polyols having three or four hydroxyl groups per molecule and a molecular weight of from about 2,000 to about 10,000 can be used. The polyol used can be a blend of diols with triols or tetrols to produce a polyol blend having an average molecular weight of from about 500 to about 10,000. Blended diols and triols for use in solid polyurethane elastomers is generally discussed in U.S. Pat. No. 3,391,101. Most preferred for use either alone or blended with a diol are the polyoxyalkylene triols nd tetrols having a molecular weight of from about 2,000 to about 7,000.

The polyether polyols may have primary or secondary hydroxyl group termination. When the polyhydric alcohol is reacted with an alkylene oxide such as propylene oxide, butylene oxide, and the like, the terminal groups are predominately secondary hydroxyl groups. However, it is within the scope of our invention to use polyether triols and polyether tetrols which have from about 5 to about 15 wt. percent ethylene oxide added thereto in a final alkoxylation step by the known alkylation processes in order to increase the terminal primary hydroxyl content of the said polyether polyol. The manufacture of ethylene oxide "tipped" polyether polyols is generally discussed in U.S. Pat. No. 3,336,242.

The amount of the amine-terminated polyethers of this invention which are incorporated into the polyether polyol B-component will vary depending upon the particular amine-terminated polyether selected and the viscosity desired for the mixed polyurethane composition immdiately after mixing of the two components. The primary amine-terminated polyethers produce the desired thickening of the mixed elastomer at lower concentrations than the corresponding partially cyano-alkylated derivatives. Generally, the polyoxyalkylene polyamines of this invention are employed in an amount of from about 1 to about 50 equivalents of the polyoxyalkylene polyamine per 100 equivalents of the polyether polyol in the B-component, with an amount of from about 5 to 15 equivalents of the polyoxyalkylene polyamine per 100 equivalents of the polyether polyol being preferred.

The B-component of the polyurethane compositions of the instant invention may comprise, in addition to the amine-terminated polyether herein described, other ingredients, for example, a chain-extending and cross-linking compound, such as a polyhydroxy compound, a urethane catalyst to promote the curing reaction, a monohydroxy polyether chain stopper, and optionally other ingredients such as fillers, antioxidants, stabilizers and colorants. Of course, fillers such as calcined clay, talc, silicas and the like, if used in large amounts, will alter the amount of the amine-terminated polyether required to effect the desired degree of thickening.

The reaction between the polyisocyanate A-component and the modified polyether polyol-containing B-component can occur non-catalytically; however, it is usually carried out in the presence of a known polyurethane catalyst which may be any of the many catalysts known to be useful for this purpose, including tertiary amines and organo-metallic salts. Suitable tertiary amines include N-methylmorpholine, N-ethylmorpholine, triethylenediamine, triethylamine, trimethylamine, and N,N-dimethylethanolamine, for example. Typical organo-metallic salts include the salts of antimony, tin, mercury and iron, for example, dibutyltin dilaurate, phenylmercuric propionate, and stannous octoate. The catalyst is usually employed in a proportion of from about 0.01% to 2.0% by weight based on the weight of the overall composition. However, the selection of the amount of catalyst and the catalyst system employed is not critical to the practice of our invention and is well within the skill of the ordinary practitioner.

Monohydroxy polyether chain stoppers which may be included in the B-component to control the hardness of the solid polyurethane elastomer are those monohydroxy polyether chain stoppers having a hydroxyl number of from about 20 to 112 and which are prepared by reacting a low molecular weight monohydroxy initiator with propylene oxide or propylene oxide and ethylene oxide wherein said propylene oxide comprises at least about 50% by weight of the oxide added to the monohydroxy initiator. The low molecular weight monohydroxy initiator may be either an aliphatic alcohol having from 1 to about 8 carbon atoms, preferably from 1 to about 4 carbon atoms, in the aliphatic hydrocarbon chain or an alkylene glycol mono-lower alkyl ether compound such as ethylene glycol monomethylether, ethylene glycol monobutylether (butyl cellosolve), propylene glycol monomethylether, propylene glycol monoethylether, diethylene glycol monobutylether (butyl carbitol), and the like. The alkylene glycol would have 2 to 4 carbon atoms and the lower alkyl group from 1 to about 4 carbon atoms. The alkyl chains of the foregping initiators can be either linear or branched. Propylene oxide or propylene oxide and ethylene oxide are reacted, either in a single step or in a plurality of steps with monohydroxy initiator in the manner well-known to those of ordinary skill in the art.

The use of an optional chain extender or crosslinking agent provides additional reactive sights which, depending upon the functionality and molecular weight, can be used to vary properties of the final polyurethane composition. The variation of the cross-linker content adds versatility to the basic material. Normally, such a crosslinking agent or chain extender would be added to the B-component to maintain the integrity of a one-shot reaction system wherein the A- and B-components are simultaneously mixed and reacted. Suitable cross-linking agents for use in the practice of our invention are described in U.S. Pat. Nos. 3,595,814, and 3,594,352, for example. The examples of such materials which may be used in the practice of our invention are material such as glycols, diamines, amino alcohols, or mixtures thereof, and particularly preferred are the monocarbamate chain extenders of the type described in U.S. Pat. No. 3,595,814 previously mentioned, for example, 2-hydroxyethyl-2-hydroxypropyl carbamate.

Other ingredients which go to make up the B-component, such as antioxidants and the like, are well-known to those skilled in the art and are described, for example, in Polymer Additives Guidebook and Directory (1972), Noyes Data Corporation.

As stated above, the B-component previously described, is reacted with an organic polyisocyanate A-component in order to produce the polyurethane compositions of our invention. Suitable organic polyisocyanates are those organic diisocyanates, triisocyanates and polyisocyanates well-known to those skilled in the polyurethane art. Mixed isomers of toluene diisocyanate which are readily available commercially, such as those described in U.S. Pat. No. 3,298,976 and the like may be used. Especially preferred are diisocyanates and higher functionality polyisocyanates prepared by the phosgenation of the reaction product of aniline and formaldehyde, such as diphenylmethane diisocyanate in its various isomeric forms, and higher functionality polymethylene polyphenyl polyisocyanates such as those described in U.S. Pat. No. 3,362,979 for example. These polymethylene polyphenyl polyisocyanates generally have an average functionality of from greater than 2.0 to about 3.3. An especially preferred organic polyisocyanate useful in the practice of our invention is the polymethylene polyphenyl polyisocyanate having a functionality of from about 2.2 to about 2.8.

In producing the polyurethane composition of our invention, the A-component and the B-component are combined such that the resulting ratio of isocyanate groups in the A-component to hydroxyl groups in the B-component, known as the isocyanate index, ranges from about 0.9:1 to about 1.4:1. It is preferred that the isocyanate index ranges from about 0.95:1 to about 1.3:1. It is within these ranges that the most desirable balance of advantageous physical properties and ambient temperature curing properties are achieved for the solid polyurethane elastomer products.

The previously mentioned advantages of the practice of our invention will be described further by way of the following specific examples in which the details are given by way of illustration and should not be construed as limitations of the invention since many obvious modifications thereof may be made by those of skill in the art after having read the foregoing disclosure and following examples.

EXAMPLE I

Three polyether polyol-containing B-components were prepared to demonstrate the advantages obtained by incorporation of the amine-terminated polyether thickeners of this invention into the polyurethane elastomer compositions resulting from reaction of the B-component with the polyisocyanate A-component. These are only specific formulations within broader types and variations within each type will be apparent to one skilled in the art.

The following B-component formulations are designated B-Components I, II and III and will be referred to as such in the other examples which follow.

| B-Compnent I | |
|---|---|
| Ingredient | Amount (wt.%) |
| THANOL R SF-6500[1] | 21.1 |
| THANOL R E-4003[2] | 42.3 |
| Calcined clay | 29.1 |
| Talc | 3.2 |
| Chromium oxide | 2.3 |
| Imperical Monarch Blue G pigment | 0.04 |
| THANOL R C-165[3] | 1.7 |
| Phenylmercuric propionate catalyst | 0.2 |
| DBPC (di-tertiarybutyl-paracresol) antioxidant | 0.13 |

[1]A 6500 molcular weight propylene oxide and ethylene oxide adduct of trimethylolpropane having about 50% primary hydroxyl groups - Jefferson Chemical Company, Inc.
[2]A polyoxypropylene/polyoxyethylene glycol having a molecular weight of about 4,000 and about 50% primary hydroxyl groups - Jefferson Chemical Company, Inc.
[3]An aliphatic diol chain extender - Jefferson Chemical Company, Inc.

| B-Component II | |
|---|---|
| Ingredient | Amount (wt.%) |
| THANOL R PPG-2000[4] | 62.4 |
| Monohydric polyether[5] | 2.9 |
| Calcined clay | 28.9 |
| Talc | 3.2 |
| Chromium oxide pigment | 2.3 |
| Imperial Monarch Blue G pigment | 0.04 |
| Phenylmercuric propionate catalyst | 0.18 |
| DBPC | 0.13 |

[4]A 2,000 molecular weight polypropylene glycol - Jefferson Chemical Company, Inc.
[5]A monohydroxy polyether chain stopper having a hydroxyl number of about 30 prepared as a propylene oxide and ethylene oxide adduct of ethylene glycol monomethyl ether.

| B-Component III | |
|---|---|
| Ingredient | Amount (wt.%) |
| THANOL R PPG-2000 | 62.4 |
| Monohydric polyether[5] | 2.9 |
| Calcined clay | 30.7 |
| Talc | 3.4 |
| Burnt umber pigment | 0.2 |
| THANOL R C-165 | 1.5 |
| Phenylmercuric propionate catalyst | 0.19 |
| DBPC | 0.13 |

[5]A monohydroxy polyether chain stopper having a hydroxyl number of about 30 prepared as a propylene oxide and ethylene oxide adduct of ethylene glycol monomethyl ether.

The amine-terminated polyether thickeners employed in the following examples are polyoxyalkylene polyamines and their partially cyanoalkylated derivatives. The method of naming these compounds is illustrated by the following:

JEFFAMINE D-400 — a polyoxypropylenediamine of 400 mol.wt.

JEFFAMINE T-403 — a polyoxypropylenetriamine of 400 mol.wt.

JEFFAMINE (⅔) CET-403 — the cyanoethyl derivative of JEFFAMINE T-403 wherein there are two cyanoethyl groups for every three amine groups in the molecule of T-403.

These compounds will be abbreviated D-400, T-403, (⅔) CET-403, etc. in the following examples.

In the following examples, reference is made to "gel" and gel characteristics of the mixed polyurethane elastomers. By "gel" is meant the attainment of a viscosity sufficient to enable the application of a relatively thick layer of the mixed elastomer to a non-horizontal surface without having the elastomer sag or run off the surface. A "caulking gel" is one in which the viscosity is such that a bead laid down in the crease of an L-shaped member retains its initial, nearly quarter-circular configuration in cross-section and does not run or flow away from the vertical side of the L-shaped member. Thus, reference to the gel character as "good" indicates that the viscosity of the mixed polyurethane elastomer was such that it held the initial bead configuration laid down and did not flow appreciably in place. "Thickened but did not gel" means that although there was an increase in viscosity in the mixed elastomer system, there was some flow in place and the bead initially laid down in an L-shaped member did not retain its initial cross-sectional configuration

EXAMPLE II

Into 50 g. of B-component I was stirred 2 g. of (⅔) CET-403. To this component was added 6 g. of a polymethylene polyphenylisocyanate (PAPI 901, The Upjohn Company) with rapid stirring. The material thickened in a few seconds to give a gel which stirred readily, but did not flow appreciably unless sheared. A ⅜ inch bead laid down in an L-shaped piece of cardboard did not sag. The elastomer then proceeded to cure normally.

EXAMPLE III

This example illustrates the gel characteristics of several of the amine-terminated polyethers of this invention when employed in a polyurethane composition comprising B-component I. The gellers were all used at the same equivalent level: 6.34 meq./100 g. (49 meq) of B-component I. The gellers were dissolved in the B-component, 9.0 g. PAPI 901 (1.24 index) was mixed in, and the gel character of the system was noted. For comparative purposes, a prior art geller, propylenediamine (PDA) was evaluated for effectiveness at the same equivalent level. The data are presented in Table I.

Table 1

| Amine Geller | Gel Character |
|---|---|
| T-403 | Good |
| T-703 | Good |
| T-1503 | Good |
| (2/3) CET-403 | Softer gel |
| D-230 | Thickened but did not gel |
| Propylenediamine (PDA) | Thickened but did not gel |

EXAMPLE IV

Two polyurethane compositions were prepared according to the general procedure of Example III employing D-230 and PDA in B-component I at twice the concentration therein employed. Also, the PAPI 901 was increased to 9.85 g. Gels were formed this time; however, the gel obtained from the PDA-containing composition had a slight grainy appearance, indicating incompatibility of the polyurea polymer in the rest of the system.

EXAMPLE V

This example compares some of the characteristics of a mixed polyurethane elastomer precursor composition employing B-component I modified with T-403 and PDA.

T-403 was used as described in Example III at the 6.34 meq. level. Two minutes after mixing, the temperature of the mix had increased only 3°C.—a mild exotherm. The system "set" (became slightly rubbery, not just thick) in 22 minutes. Without geller, the system sets in 23 minutes.

PDA was used at the 12 meq. level in order to attain a gel. The initial exotherm was 10°C. and the mixture "set" in 19 minutes. If fairly large batches were mixed, the large heat build-up would accelerate the urethane reaction and significantly shorten the "set" time.

EXAMPLE VI

This example illustrates the use of isocyanates other than PAPI 901 with B-component I modified by the inclusion of T-403. Proportions were the same as in Example V.

Table 2

| Isocyanate | Results |
|---|---|
| PAPI R901 | Standard of comparison |
| THANATE RP-220[1] | Like standard |
| ISONATE IR43-L[2] | Like standard |
| THANATE RP-270[3] | Thicker gel than standard |
| THANATE RP-210[4] | Thinner gel than standard |
| Toluene diisocyanate | Had to increase T-403 50% to get satisfactory gel |

[1]A polymethylene polyphenyl isocyanate having a functionality of about 2.2, Jefferson Chemical Company, Inc.
[2]A modified diphenylmethane diisocyanate having an equivalent weight of 143, The Upjohn Company.
[3]A polymethylene polyphenyl isocyanate having a functionality of about 2.7, Jefferson Chemical Company, Inc.
[4]A polymethylene polyphenyl isocyanate having a functionality of about 2.1, Jefferson Chemical Company, Inc.

EXAMPLE VII

In this example, the effectiveness of T-403 is compared with PDA in a mixed polyurethane composition employing B-component II. T-403 was used at the 6.34 meq. level. Gel behavior was essentially like that for a mixed polyurethane composition employing a similarly modified B-component I; however, the mixed polyurethane composition employing modified B-component II is more easily gelled than I, with as little as 4 meq. T-403 being sufficient to give a satisfactory caulking gel.

PDA used at 1.9 meq. gave a gel, but only after 2–3 minutes had elapsed after mixing. Also, there was some delay in viscosity build-up, and the viscosity continued to change with no "flat" behavior. Thus, the mixed polyurethane composition continued to thicken with time, so that the "workability" of the system changed constantly. This system could not be used in a continuous caulking operation because the material was not gelled soon after mixing.

EXAMPLE VIII

This example illustrates the use of the amineterminated polyethers of this invention in smaller amounts so as to render the mixed polyurethane composition thixotropic but not gelled. Such a system is advantageous in polyurethane coatings, since thicker coatings may be laid down than would be possible otherwise. This improved thixotropy was demonstrated by preparing a polyurethane composition employing B-component II modified with T-403 and measuring the viscosity compared to an unmodified polyurethane composition. The data is tabulated in the following table.

Table 3

| | Brookfield Viscosity No. LV-4 Spindle, cps | |
|---|---|---|
| Spindle RPM | No geller | 1.9 meq. T-403 |
| 3 | 4,600 | 14,000 |
| 6 | 3,900 | 9,300 |
| 12 | 3,200 | 6,600 |
| 30 | 2,700 | 4,600 |
| 60 | 2,500 | 3,600 |

The measured viscosity and the viscosity index was attained very quickly and held for several minutes—until the urethane reaction got underway. The viscosity of the mixed system may be obtained at any desired level by adjusting the amount of T-403.

EXAMPLE IX

This example illustrates a practical method for using a gelled elastomer system in a continuous, or semicontinuous, caulking operation. The caulking gun consisted of a cylindrical chamber of about 5 ml. volume containing a motor-driven mechanical stirrer. Components were metered into one end of the mixer and gelled elastomer mix issued from the other end through a short caulking nozzle. The mixed polyurethane composition of Example III employing T-403 as the geller was used. A ½ inch bead which did not flow further was easily laid down continuously in an L-shaped receiver.

EXAMPLE X

This example illustrates the stability of the B-component containing the amine-terminated polyether geller. The addition of 1 g. (6.34 meq.) of T-403 to 100 g. of B-component III did not cause any thickening prior to the addition of isocyanate. To the contrary, the B-component actually becomes less viscous and thixotropic. The viscosity data is shown below.

Table 4

| Spindle RPM | Viscosity, No. 4 Spindle 25°C., cps | |
|---|---|---|
| | Without T-403 | With T-403 |
| 3 | 4,200 | 2,200 |
| 12 | 2,750 | 2,000 |
| 60 | 1,930 | 1,650 |

EXAMPLE XI

This example demonstrates the usefulness of polyurethane compositions comprising B-components modified by the amine-terminated polyethers of this invention for coating inclined or vertical surfaces with no run-off—even at high-build. 101.5 parts by weight of B-component III modified by the inclusion of 1 wt.% of T-403 was mixed with 12.7 parts by weight of PAPI 901. The mixed and gelled elastomer composition was troweled onto a concrete ramp of 37° incline to a ½ inch thickness. The material troweled easily with no subsequent flow, and cured normally to give a rubber-like walkway.

I claim:

1. In a polyurethane elastomer composition prepared by admixing and reacting an organic polyisocyanate compound having free isocyanate moieties, a polyether polyol compound and a selected urethane catalyst, the improvement which comprises:
adding to said admixture from about 1 to about 50 equivalents per 100 equivalents of said polyether polyol of a polyoxyalkylene polyamine of the formula:

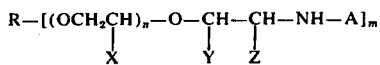

wherein R is the nucleus of an oxyalkylation-susceptible saturated polyhydric alcohol containing 2 to 12 carbon atoms and 2 to 8 hydroxyl groups and R consists of hydrogen and carbon, Z is an alkyl group containing 1 to 18 carbon atoms, X and Y independently are hydrogen or Z, A is cyano-loweralkyl of 1 to 2 carbon atoms or hydrogen, n has an average value of 0 to 50 and m is an integer of 2 to 8 corresponding to the number of hydroxyl groups originally present in the polyhydric alcohol.

2. A polyurethane composition according to claim 1 wherein said polyoxyalkylene polyamine is present in said polyether polyol in amounts from about 5 to about 15 equivalents of the polyoxyalkylene polyamine per 100 equivalents of said polyether polyol.

3. A polyurethane composition according to claim 2 wherein the polyoxyalkylene polyamine is a polyoxypropylene polyamine wherein Z is methyl, Y is hydrogen, X is Z, n is from 1 to 16 and m is from 2 to 4.

4. A polyurethane composition according to claim 3 wherein the polyoxypropylene polyamines are polyoxypropylene diamines of the formula

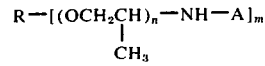

wherein R is 1,2-propylene radical, m is 2, n is from about 2 to about 16 and A is hydrogen or cyano-loweralkyl having 1 to 2 carbon atoms.

5. A polyurethane composition according to claim 4 wherein A is cyanoethyl and n is 2 to 16.

6. A polyurethane composition according to claim 3 wherein the polyoxypropylene polyamines are polyoxypropylene triamines of the formula

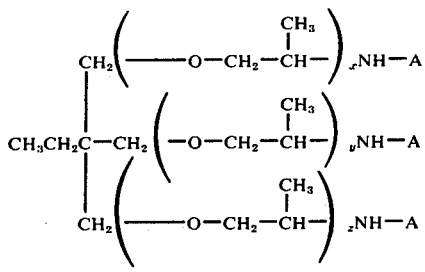

wherein R is the nucleus of trimethylolpropane, m is 3, x, y and z independently are integers of from 1 to 10, with the sum of x+y+z being from about 3 to about 30.

7. A polyurethane composition according to claim 6 wherein A is cyanoethyl and the sum of x+y+z is from about 4.6 to about 9.8.

8. A polyurethane composition according to claim 2 wherein the organic polyisocyanate compound is a polymethylene polyphenyl polyisocyanate having an average functionality of from about 2.2 to about 2.8.

9. The polyurethane composition of claim 8 wherein said polyether polyol is a polyether polyol having an average molecular weight of from about 1,000 to about 7,000.

10. The polyurethane composition of claim 9 wherein said polyether polyol is a mixture of a polyether diol and a polyether triol having a molecular weight of from about 4,500 to about 6,500.

11. The polyurethane composition of claim 2 wherein the isocyanate index is from about 0.9 to about 1.4.

12. The polyurethane composition according to claim 4 wherein A is hydrogen and n is 2 to 16.

13. The polyurethane composition of claim 6 wherein A is hydrogen and the sum of x+y+z is from about 4.6 to about 9.8.

* * * * *